(12) United States Patent
Saha et al.

(10) Patent No.: US 7,937,455 B2
(45) Date of Patent: *May 3, 2011

(54) METHODS AND SYSTEMS FOR MODIFYING NODES IN A CLUSTER ENVIRONMENT

(75) Inventors: Debashis Saha, Sunnyvale, CA (US);
Rajiv Jayaraman, Foster City, CA (US);
Bharat Paliwal, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1020 days.

This patent is subject to a terminal disclaimer.

(21) Appl. No.: 10/901,830

(22) Filed: Jul. 28, 2004

(65) Prior Publication Data

US 2006/0037016 A1    Feb. 16, 2006

(51) Int. Cl.
*G06F 15/16* (2006.01)

(52) U.S. Cl. .................................... 709/220

(58) Field of Classification Search .......... 709/203–205, 709/209, 220, 221; 714/4, 12, 15, 48, 49
See application file for complete search history.

(56) References Cited

U.S. PATENT DOCUMENTS

| | | | |
|---|---|---|---|
| 5,564,051 A | 10/1996 | Halliwell et al. | |
| 5,692,106 A | 11/1997 | Towers et al. | |
| 5,822,531 A | 10/1998 | Gorczyca et al. | |
| 6,041,324 A | 3/2000 | Earl et al. | |
| 6,173,420 B1 * | 1/2001 | Sunkara et al. | 714/38 |
| 6,560,699 B1 | 5/2003 | Konkle | |
| 6,615,255 B1 | 9/2003 | Blaszczak | |
| 6,633,891 B1 | 10/2003 | Bamford et al. | |
| 6,671,874 B1 | 12/2003 | Passova | |
| 6,801,937 B1 * | 10/2004 | Novaes et al. | 709/220 |
| 6,954,930 B2 | 10/2005 | Drake et al. | |
| 6,990,602 B1 * | 1/2006 | Skinner et al. | 714/4 |
| 7,370,092 B2 * | 5/2008 | Aderton et al. | 709/220 |
| 7,536,599 B2 | 5/2009 | Paliwal et al. | |
| 2001/0008019 A1 | 7/2001 | Vert et al. | |
| 2001/0056462 A1 | 12/2001 | Kataoka | |
| 2002/0049859 A1 | 4/2002 | Bruckert et al. | |
| 2002/0052937 A1 | 5/2002 | Jager | |

(Continued)

FOREIGN PATENT DOCUMENTS

GB    2 368 682 A    5/2002

(Continued)

OTHER PUBLICATIONS

U.S. Appl. No. 10/901,831, filed Jul. 28, 2004, Office Action mailed Jun. 12, 2007, 25 pages.

(Continued)

*Primary Examiner* — Moustafa M Meky
*Assistant Examiner* — Hee Soo Kim
(74) *Attorney, Agent, or Firm* — Kilpatrick Townsend & Stockton LLP

(57) ABSTRACT

Various embodiments of the invention provide solutions to allow more efficient management of clustered environments. Merely by way of example, some embodiments provide a framework for the relatively automated management of clusters, including the addition, deletion and/or modification of cluster nodes. In certain embodiments, this framework may be incorporated within a software application that can assist in the configuration of clusters. Other embodiments provide methods of managing clusters and/or their nodes, including, inter alia, methods of establishing and/or implementing such frameworks. Still other embodiments provide systems, including clustered systems, that provide relatively automated cluster management capabilities.

37 Claims, 6 Drawing Sheets

U.S. PATENT DOCUMENTS

| | | |
|---|---|---|
| 2002/0133727 A1 | 9/2002 | Dervin et al. |
| 2002/0156951 A1 | 10/2002 | Beeston et al. |
| 2002/0194015 A1 | 12/2002 | Gordon et al. |
| 2002/0198967 A1 | 12/2002 | Iwanojko |
| 2002/0198968 A1 | 12/2002 | Shirriff |
| 2003/0018699 A1 | 1/2003 | Matthews et al. |
| 2003/0018927 A1 | 1/2003 | Gadir et al. |
| 2003/0074426 A1 | 4/2003 | Dervin et al. |
| 2003/0120464 A1 | 6/2003 | Taft et al. |
| 2003/0126504 A1 | 7/2003 | Ryan et al. |
| 2003/0182650 A1 | 9/2003 | Smith |
| 2003/0182656 A1 | 9/2003 | Leathers et al. |
| 2003/0187927 A1 | 10/2003 | Winchell |
| 2003/0208750 A1 | 11/2003 | Tapper |
| 2003/0220951 A1 | 11/2003 | Muthuligam et al. |
| 2003/0220992 A1 | 11/2003 | DiRico |
| 2003/0227477 A1 | 12/2003 | Kadiwala |
| 2004/0006610 A1 | 1/2004 | Anagol-Subbarao et al. |
| 2004/0019820 A1 | 1/2004 | Whitlow |
| 2004/0106088 A1 | 6/2004 | Driscoll et al. |
| 2004/0267913 A1* | 12/2004 | Koneru .................. 709/221 |
| 2005/0234680 A1* | 10/2005 | Dettinger et al. ......... 702/182 |

FOREIGN PATENT DOCUMENTS

| | | |
|---|---|---|
| WO | WO99/24945 A1 | 5/1999 |
| WO | WO02/46914 A2 | 6/2002 |
| WO | WO03/048994 A2 | 6/2003 |
| WO | WO 03/073278 A2 | 9/2003 |

OTHER PUBLICATIONS

U.S. Appl. No. 10/901,831, filed Jul. 28, 2004, Notice of Allowance mailed Jan. 9, 2008, 8 pages.

U.S. Appl. No. 10/901,831, filed Jul. 28, 2004, Notice of Allowance mailed Aug. 11, 2008, 4 pages.

* cited by examiner

METHODS AND SYSTEMS FOR MODIFYING NODES IN A CLUSTER ENVIRONMENT

BACKGROUND

The present invention relates to generally computer systems, and particularly to computer systems operating in a cluster environment.

Over the last decade, companies within virtually every industry have relied ever more heavily on computerized systems to enable those companies to maintain competitive positions within their respective industries. At the same time, businesses have attempted to move from large mainframes toward more distributed computing systems, often in an effort to minimize the costs associated with their information infrastructures. At the same time, however, companies continue to demand increased reliability, scalability and responsiveness from their computer systems.

One strategy frequently employed to harmonize the move to smaller systems with the continued need for the scalability, reliability and responsiveness traditionally associated with large systems is to "cluster" several Intel™ and/or UNIX™ based servers together. Those skilled in the art will appreciate that cluster computing requires relatively low initial capital investment (especially when compared with a mainframe-based solution) but still provides the desired reliability and responsiveness. Moreover, cluster solutions allow for a high degree of scalability, as servers may be upgraded and/or added to the cluster as needs grow. Server clusters have proved particularly advantageous in transaction-intensive applications, such as web servers, database servers, application servers and the like.

In the past, however, server clusters have been relatively difficult to administer. In a typical cluster, each server will have its own operating system, as well as "clusterware" that allows the servers to interoperate as a cluster, and a cluster-enabled application, such as a database management system, web server application and/or the like. Merely by way of example, a typical cluster node may be running a variant of UNIX or Linux, such as Sun Corporation's Solaris™ operating system or the free RedHat™ Linux operating system, clusterware such as Oracle Corporation's Cluster Ready Services™, and a database application, such as Oracle's 10g™ relational database management system ("RDBMS").

When adding, deleting or reconfiguring a node in the cluster, the node to be modified (as well, in many cases, as the other nodes in the cluster) generally will have to be configured. This configuration may include changes to the operating system, clusterware and/or applications. Such configuration often must be performed manually on each node, resulting in increased labor costs and frustration for administrators. In addition, manual configuration presents many opportunities for misconfiguration, such as configuring parameters on one node that render that node incompatible with other nodes in the cluster, that may not be readily ascertainable from the behavior of the cluster. Such opportunities for misconfiguration merely increase the cost and frustration already inherent in the management of clusters.

Further, in many cases, modification of a cluster (or a node therein) is performed in response to some system failure. For example, if a node fails, the cluster may need to be reconfigured to allow the removal of that node, to reconfigure the failed node and/or to add a replacement node. Often, therefore, the entire cluster may be unavailable, or at the very least severely impaired, until the reconfiguration is complete.

Consequently, there is a need for solutions that can ease the administrative burdens of clustered computing.

SUMMARY

Various embodiments of the invention provide solutions to allow more efficient management of clustered environments. Merely by way of example, some embodiments provide a framework for the relatively automated management of clusters, including the addition, deletion and/or modification of cluster nodes. In certain embodiments, this framework may be incorporated within a software application that can assist in the configuration of clusters. Other embodiments provide methods of managing clusters and/or their nodes, including, inter alia, methods of establishing and/or implementing such frameworks. Still other embodiments provide systems, including clustered systems, that provide relatively automated cluster management capabilities.

Merely by way of example, one set of embodiments provides a clustered computer system. In accordance with some embodiments, the clustered computer system can include a first node computer, which may have a first processor and a first computer readable medium. The first computer readable medium may comprise a first set of software, including, merely by way of example, an operating system executable by the first processor, a clusterware program executable by the first processor to allow the first node computer to operate as part of a cluster environment, and/or an application program executable by the first processor to provide application services as part of the cluster environment.

The clustered computer system may further include a second node computer. The second node computer may comprise a second processor and a second computer readable medium having a second set of software. The clustered computer system can also comprise a control computer in communication with the second node computer.

The control computer may comprise a third processor and a third computer readable medium; in some embodiments, the third computer readable medium can comprise instructions executable by the third processor to configure the second set of software to allow the second node computer to operate as part of the cluster environment. The control computer may include further instructions executable to configure the second set of software to allow the second node computer to provide application services as part of the cluster environment. Such application services can include, without limitation, database services, Internet and/or WWW services, enterprise application services (such as enterprise resource management applications, etc.), and/or the like.

In accordance with some embodiments, configuring the second set of software to allow the second node computer to operate as part of the cluster environment can comprise installing and/or configuring an operating system, a clusterware program and/or an application program, which may, in some cases, be a cluster-enabled application program. In other embodiments, configuring the second set of software to allow the second node computer to operate as part of the cluster environment may comprise interrogating the first node computer to determine a configuration of the first set of software and/or validating at least one system parameter on the second node computer, e.g., to determine whether the second node computer is capable of serving as a node in the clustered environment. In further embodiments, configuring the second set of software to allow the second node computer to operate as part of the cluster environment may comprise allowing an administrator to input parameters specific to the second node computer and/or updating the second set of software with parameters specific to the second node computer. In yet further embodiments, the control computer may be operative to configure the first node computer to recognize the second node computer as a member of the cluster environment.

Depending on the embodiment, the control computer may be the first node computer, the second node computer and/or a computer separate from the first and second node computers.

Another set of embodiments provides methods for configuring a cluster environment and/or a node thereof. An exemplary method may comprise determining an existing configuration of a first node computer in a cluster environment, receiving information specific to a second node computer to be configured, and/or configuring the second node computer. In some embodiments, the method can further include preparing a model configuration for the second node computer, and/or the second node computer can be configured according to the model configuration. In other embodiments, the method can include adding the second node computer to the cluster environment. In accordance with certain embodiments, the first node computer may comprise a cluster inventory, and/or adding the second node computer to the cluster environment may comprise updating the cluster inventory to account for the second node computer.

In some cases, determining an existing configuration of a first node computer in a cluster environment may comprise interrogating the first node computer. Alternatively and/or in addition, determining an existing configuration of a first node computer may comprise identifying a first set of software installed on the first node computer, and/or installing a set of software on the second node computer may comprise installing a second set of software on the second node computer; the second set of software may correspond to the first set of software. Installing a second set of software on the second node computer further may comprise updating at least one parameter on the second node computer with information specific to the second node computer.

In other cases, configuring the second node computer may comprise installing and/or configuring a set of software on the second node computer. The set of software may comprise one or more operating systems, clusterware programs and/or application programs. Further, configuring the second node computer may comprise configuring the application program to be cluster-enabled.

In still other embodiments, the method may further comprise validating the second node computer, e.g., to ensure that the second node computer is capable of serving as a member of the cluster environment. Validating the second node computer can take many forms. Merely by way of example, validating the second node computer may comprise reading an input file having a plurality of validation test identifiers identifying validation tests to validate a system environment for an application, executing at least a portion of the validation tests, and/or outputting the results of the validation tests.

Other embodiments of the invention can include systems configured to perform various of the methods described above and/or computer readable media (including software program products) executable by a machine (e.g., a computer) to perform these methods.

The invention has been briefly summarized above. A further understanding of specific details and features of the invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION

1. General Overview

Figure 1:
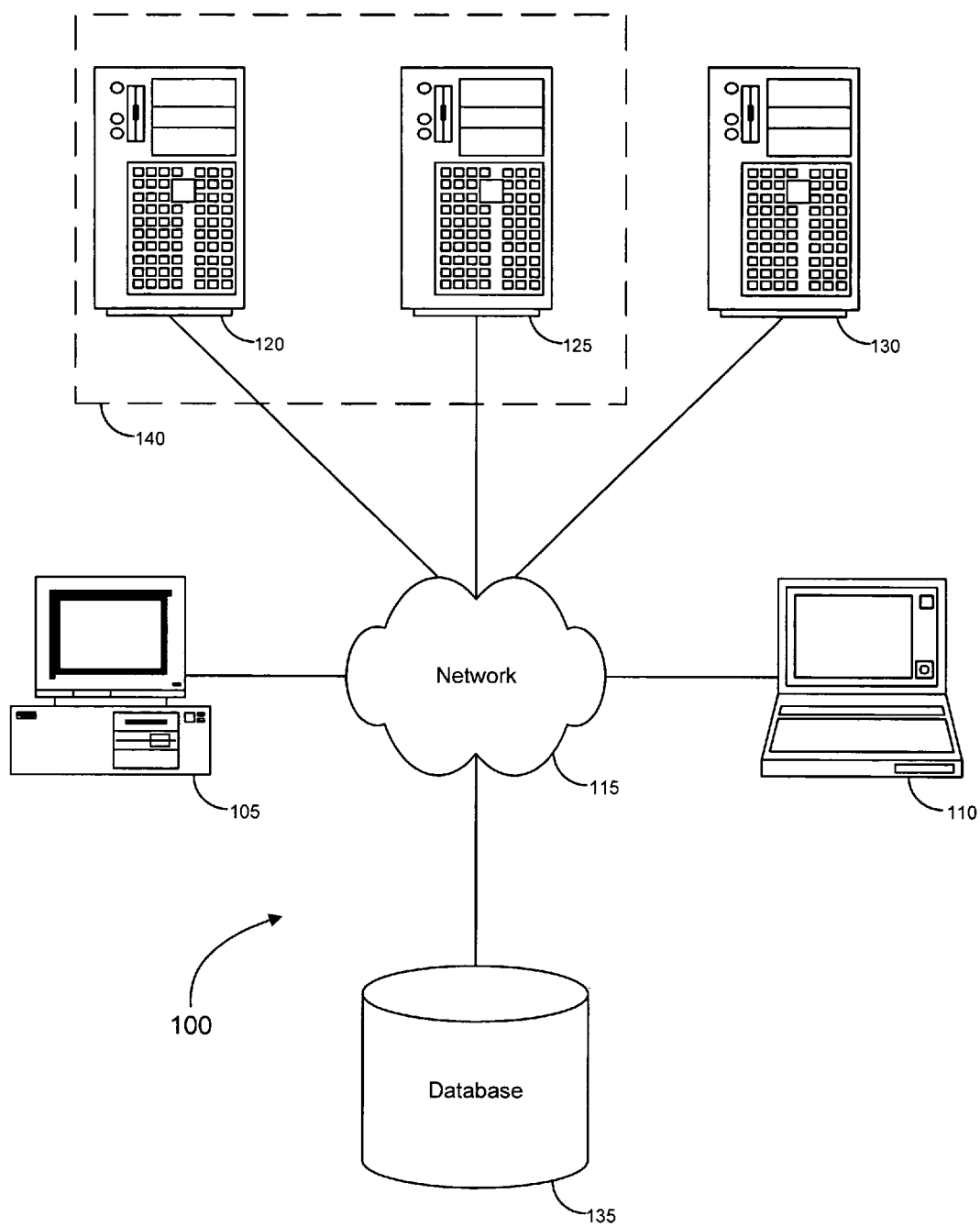
FIG. 1 is an architectural diagram of an exemplary computer network system that can be used to configure nodes in a cluster environment, in accordance with various embodiments of the invention.

Various embodiments of the invention provide solutions to allow more efficient management of clustered environments. Merely by way of example, some embodiments provide a framework for the relatively automated management of clusters, including without limitation the addition, deletion, modification and/or configuration of cluster nodes. In certain embodiments, this framework may be incorporated within one or more software applications that can assist in the configuration of clusters. Other embodiments provide methods of managing clusters and/or their nodes, including, inter alia, methods of establishing and/or implementing such frameworks. Still other embodiments provide systems, including clustered systems, that provide relatively automated cluster management capabilities.

In particular, some embodiments of the invention provide methods, systems and software applications for adding, removing and/or configuring nodes in a cluster environment. (For ease of description, these tasks are referred to herein collectively as "configuring" a node, except where the context clearly indicates otherwise.) Merely by way of example, one set of embodiments provides a computer software framework for configuring nodes in a cluster environment, including for instance, adding one or more new nodes to the cluster. The framework can include a configuration manager, which can accept configuration input from an administrator, interrogate existing nodes to determine configuration parameters for the cluster, and/or access installation software (and/or a master copy of software already installed, perhaps on an existing node, which can be copied or "cloned" to a new node). The configuration manager can also assess the new node to verify that the new node meets the hardware and/or software requirements to be a member of the cluster. If desired, the configuration manager can automatically install and/or configure software packages on the new node, configure parameters of the new node, and/or the like. In some embodiments, the configuration manager can also access any existing nodes to modify parameters on those nodes (for instance, to define the new node as a member of the cluster, to rebalance workload, etc.).

In many embodiments, the new node(s) to be added to the cluster may not have the proper software installed. In such cases, the configuration manager may evaluate the new node(s) to determine what software needs to be installed, and/or the configuration manager may then install the necessary software. Installation can include a packaged installation (in which case the configuration manager may have programmatic access, perhaps through an API, to a software installation program) and/or a bit-for-bit copy from an existing installation. The software to be installed may be packaged with the configuration manager, and/or it may be provided by a third party. Any suitable type of software may be installed and/or configured with the configuration manager.

Merely by way of example, membership in the cluster may require the new node to have a variety of software components installed. One such component may be an operating system; another may be a layer of software (referred to herein as "clusterware") that allows the computer to function as a node in coordination with other nodes; a third component may be an application program, which may need to be "cluster-aware" in order to properly operate in a cluster environment. In such cases, the new node may ship with an operating system installed but with no other components. The configuration manager may verify the state of the operating system (version, patch level, etc.) and apply any necessary updates. The configuration manager may then install the clusterware application and/or configure any necessary parameters. Then, the configuration manager might perform a bit-by bit copy of a database management application and/or an associated database, optionally modifying any node-specific parameters in the application. The configuration manager might also update any necessary system parameters on the new node and update the existing nodes to define the new node, thereby allowing the new node to become a member ("join") the cluster.

In some cases, the configuration manager can be a software application executing on a control computer. The control computer may be a workstation in communication with one or more of the existing nodes and/or in communication with the new node to be added. In other embodiments, the control computer may be one of the existing nodes and/or may be the new node to be added. In particular embodiments, the configuration manager can be a component (and/or have an API for execution by) an installation program. In some cases, for example, the configuration manager may be shipped as part of an installation package or program for an operating system, clusterware program and/or cluster-aware application. If desired, the installation program can be run in an "addnode" mode (perhaps via a command line parameter, etc.), indicating to the installation program that the software is to be installed to a computer that will join a cluster as a new node, thus invoking the configuration manager as a framework in which to perform the installation.

In some cases, the configuration manager may utilize source files, which can be XML files, etc., in order to allow for automated yet customized configuration/installation. If necessary, source files can be modified by an administrator prior to running the configuration manager. For example, a source file may include references to all software that should be copied/installed (as well, perhaps, as locations for the code to be copied/installed), and/or instructions for how to install/copy the code. Another source file may include all cluster-specific parameters that should be used in the configuration of the new node, while still another source file may include all node-specific parameter (host names, IP addresses, etc.). (Each of these, and other, source files may be incorporated into a single source file, in accordance with some embodiments. The composition and organization of source files is discretionary.) Thus, a plurality of nodes may be configured with relatively minor administrative overhead for each node (perhaps modification of the node-specific file only). Alternatively, the configuration manager may be run in an interactive mode, so that software packages and/or configuration parameters may be specified by an administrator at run-time. In some cases, a combination of source files and interactive input may be used.

In many embodiments, the configuration manager may be configured to perform all necessary configuration of the new node prior to joining that node as a member of the cluster. In some embodiments, therefore, the configuration of the nodes and/or cluster can be performed as a "hot" addition, such that the cluster may remain available during the configuration process.

2. Exemplary Embodiments

Some embodiments of the invention, including those described generally above, may be performed in a computer system. FIG. 1 illustrates a block diagram of an exemplary system 100 depicting some such embodiments. The system 100 can include one or more user computers 105, 110. The user computers 105, 110 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110 may also have any of a variety of applications, including, merely by way of example, one or more application development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported. In some cases, a user computer may be configured to operate as a control computer for a cluster, functioning in a manner described in more detail below. (In other cases, the user computers 105, 110 may be omitted, and a server computer and/or cluster node may be configured to act as the control computer.)

In some embodiments, the system 100 may also include a network 115. The network may can be any type of network familiar to those skilled in the art that can support data communications using any of a variety of commercially-available protocols, including without limitation TCP/IP, SNA™, IPX™, AppleTalk™, and the like. Merely by way of example, the network 115 maybe a local area network ("LAN"), such as an Ethernet network, a Token-Ring™ network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks. The network 115 may comprise a dedicated and/or high-speed switch and/or backplane allowing relatively rapid communication between nodes.

The system may also include one or more server computers 120, 125, 130. The server(s) 120, 125, 130 may be one or more general purpose computers and/or dedicated server computers (including without limitation stand-alone servers, rack-mounted servers, etc.) capable of executing programs or scripts in response to the user computers 105, 110. One or more of the servers may be a web server, which may be used to process requests for web pages or other electronic documents from user computers 105, 110. The web server can be running an operating system including any of those discussed above, as well as any commercially-available server operating systems including without limitation UNIX (or any similar derivative) Windows Server™, OS/390™, OS/400™, VMS™, etc. The web server can also run a variety of server applications, including HTTP servers, FTP servers, CGI servers, database servers, Java servers, and the like. In some embodiments, a database client and/or administration program may be operated within a web browser on one or more of the user computers 105, 100. In these embodiments, all user interaction with the system can take place via web pages sent to user computers via the web server.

The system 100 may also include one or more file and or/application servers, which can, in addition to an operating system, include one or more applications accessible by a client running on one or more of the user computers 105, 110. As one example, the server may execute one or more web applications. The web application may be implemented as one or more scripts or programs written in any programming language, such as Java™, C, C#™ or C++, and/or any scripting language, such as Perl, Python™, or TCL, as well as combinations of any programming/scripting languages. The application server(s) may also include database servers, including without limitation those commercially available from Oracle™, Microsoft™, Sybase™, IBM™ and the like, which can process requests from database clients running on a user computer 105, 110.

In some embodiments, an application server may create web pages dynamically for displaying necessary configuration/management utilities, applications, etc. The web pages created by the web application server may be forwarded to a user computer 105 via a web server. Similarly, the web server can receive web page requests and/or input data from a user computer and can forward the web page requests and/or input data to the web application server.

In further embodiments, the server may function as a file server and/or may include one or more of the files necessary for operation of a configuration/management application running on a user computer 105. Alternatively, as those skilled in the art will appreciate, the file server may include all necessary files, and/or the configuration/management application may be invoked remotely by a user computer 105. Those skilled in the art will recognize that the functions described with respect to various types of servers may be performed by a single server and/or a plurality of specialized servers, depending on implementation-specific needs and parameters.

In accordance with some embodiments, two or more servers 120, 125 may be configured to operate in a clustered environment (as indicated by the broken line 140 of FIG. 1). As defined herein, a cluster of computers can include one or more computers that are configured to operate in coordinated fashion, e.g., by providing parallel processing of instructions, responding to job requests cooperatively, maintaining multiple instances of an application and/or a database, and/or the like. In particular embodiments, a cluster may be configured to provide database services, and/or each member ("node") of a cluster may be configured to operate an RDBMS (such as Oracle 10g™), which may be a cluster-aware. (Merely by way of example, Oracle's Real Application Clusters™ software is an example of a cluster-aware RDBMS.) Optionally, as described below, each server 120, 125, 130 can have a separate partition and/or instance of a database managed by that database management program. The cluster, therefore, can provide database services on a scalable, high-availability basis familiar to those skilled in the art. Each of the servers 120, 125, 130 may also include one or more "clusterware" programs familiar to those skilled in the art. One example of a clusterware program that may be employed in various embodiments is Oracle's Cluster Ready Services™ ("CRS").

Some embodiments may also include an additional server 130, which may be configured somewhat similarly to the servers 120, 125 above. In particular embodiments, the server 130 initially may not be configured as a node of the cluster 140 and/or initially may not be configured at all (e.g., the server 130 may have no software installed and/or may only have an operating system installed). In accordance with embodiments of the invention, the server 130 may, in some cases, be configured (e.g., using methods of the invention, as discussed in detail below) to join the cluster as a member.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g™, that is adapted to store, update, and retrieve data in response to SQL-formatted commands.

In particular embodiments, each server 120, 125, 130 and/or each cluster node 120, 125 may include and/or have access to its own database 135, which may be stored local to that server, on a network (including a SAN), etc. In some of these embodiments, each server's database may be an instance and/or partition of a common, clustered database, an arrangement familiar to those skilled in the art. In other embodiments, each node 120, 125 may be configured to access a common instance of the database 135.

Figure 2:
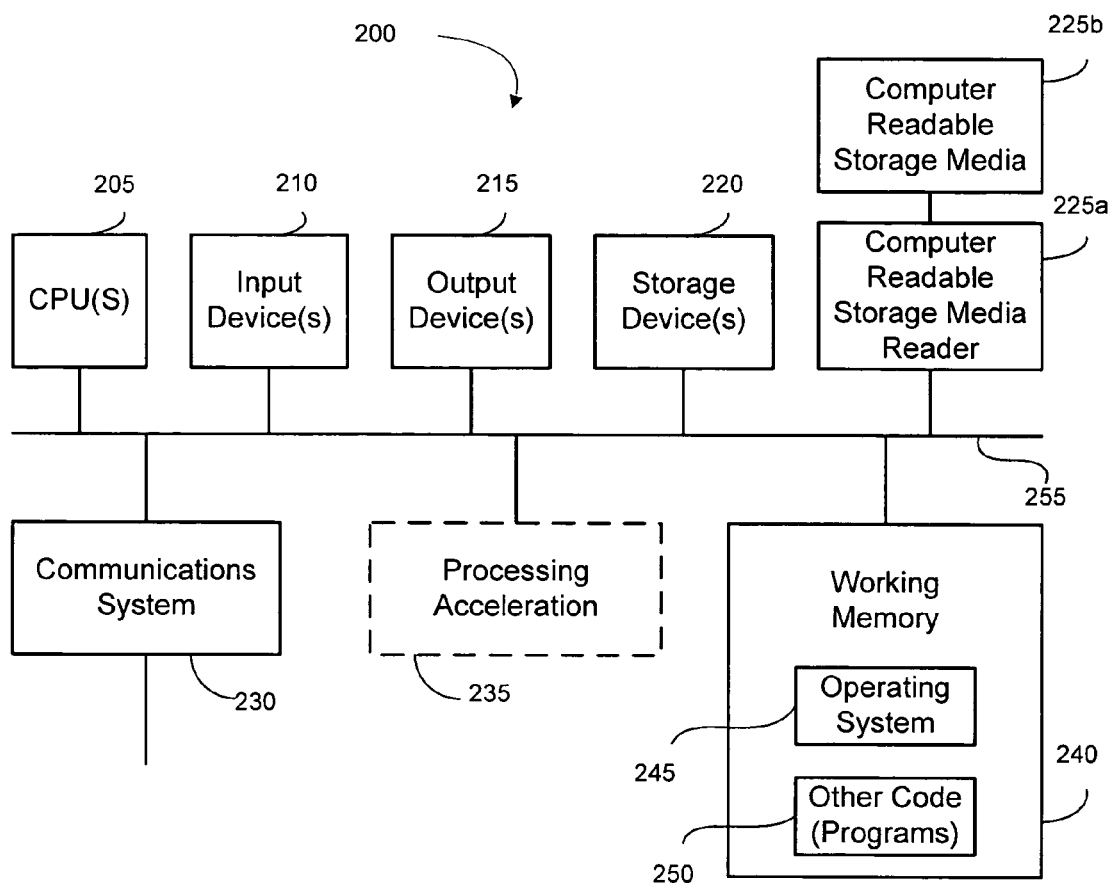
FIG. 2 is a generalized illustration of a computer system that may be used to configure nodes in a cluster environment, in accordance with various embodiments of the invention.

FIG. 2 is a generalized schematic diagram illustrating a computer system 200, which may be used as a server, user computer, cluster node and/or workstation, in accordance with various embodiments of the invention. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected with a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 120 and/or any other computer described above with respect to the system 100.

The computer system 200 may also comprise software elements, shown as being currently located within a working memory 240, including an operating system 245 and/or other code 250, such as an application program. The application programs may have instructions and/or be designed to implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection with other computing devices such as network input/output devices may be employed.

Figure 3:
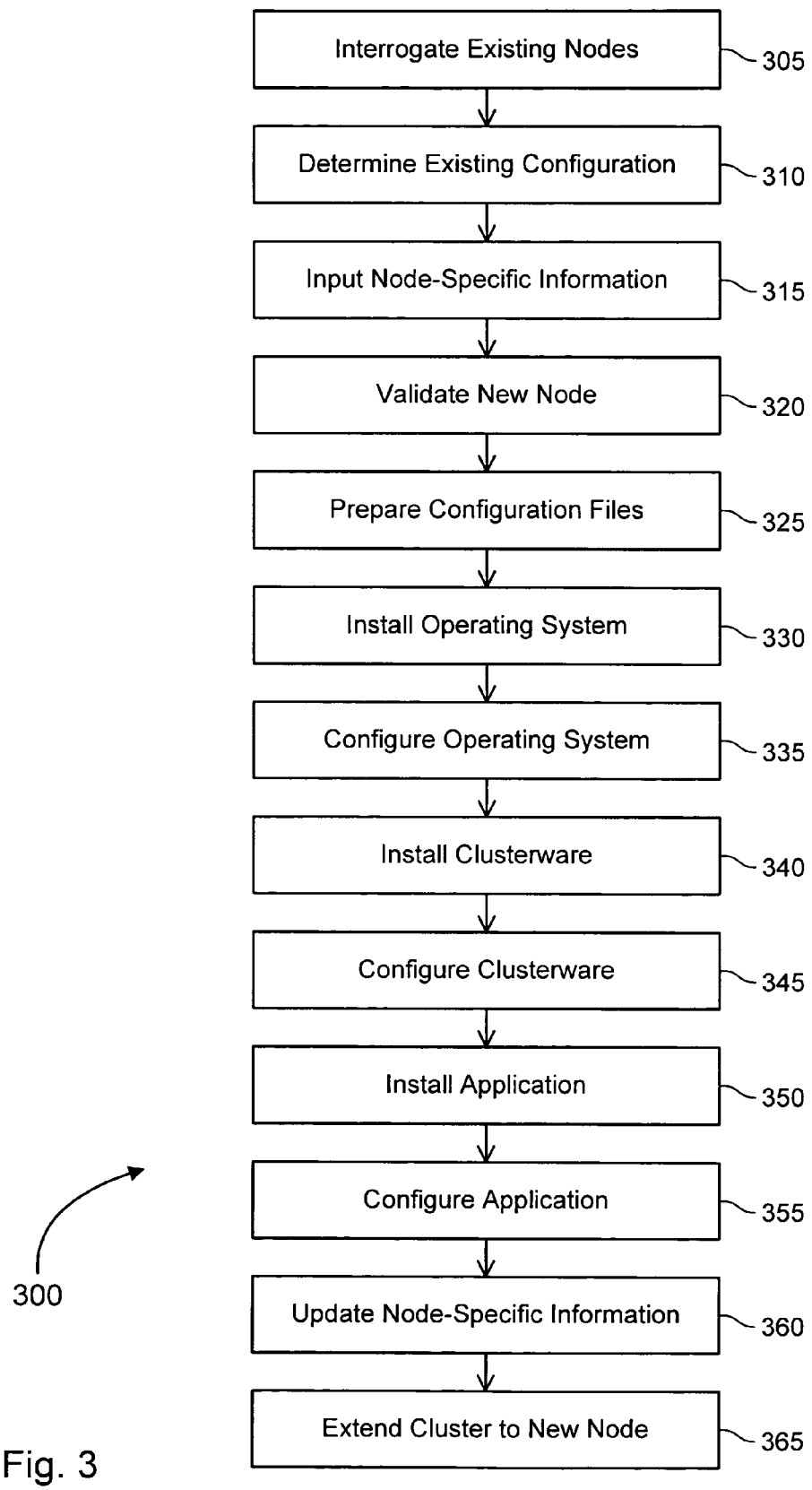
FIG. 3 is a flow diagram illustrating a method of configuring nodes in a cluster environment, in accordance with various embodiments of the invention.

As noted above, another set of embodiments includes methods of configuring a cluster and/or one or more nodes of that cluster. FIG. 3 is a process flow diagram illustrating a method 300 of modifying a node in a cluster environment, in accordance with various embodiments of the invention. Although described with respect to the modification of a single node (e.g., the addition of a node to a cluster), it should be appreciated that in some case the method 300 may be performed iteratively and/or in parallel for a plurality of nodes, allowing the modification of any appropriate number of nodes, simultaneously if desired. In such cases, some steps in the method 300 may be performed individually for each node to be added/modified, while other steps may be performed collectively for all nodes to be added/modified. Moreover, while some or all of the procedures described with respect to this method 300 may be performed by a software application, such as a configuration manager, embodiments of the invention are not limited to any particular functional or architectural implementation.

The method can include, at block 305, interrogating one or more existing nodes in the cluster. Interrogating an existing node can include several procedures. The configuration manager may use a variety of industry-standard and/or proprietary methods for interrogating a node. Merely by way of example, in a UNIX™ or UNIX-like environment, several standard files can be parsed to find system information, and/or standard commands may be executed (perhaps by using an automated remote shell or login) to determine hardware and/or system configuration information. Other operating systems, such as Windows NT™ or Windows Server™, include similar functionality. Likewise, many clusterware programs and/or application programs (such as Oracle CRS™ or the Oracle 10g™ RDBMS) provide APIs and/or other interfaces allowing programmatic access to configuration information. Those skilled in the art will appreciate, based on the disclosure herein, that the control computer on which the configuration manager runs may need to have appropriate access permissions to the existing nodes to perform such interrogation. Optionally, the configuration manager may create an output file containing such information, for review and/or future use.

Interrogating one or more existing nodes can allow for the determination of an existing configuration of the nodes and/or a cluster to which they belong (block 310). Determining the existing configuration can include analyzing a set of software on the existing node to determine what software is installed, the configuration of that software and/or the configuration of the hardware. Merely by way of example, determination of an existing configuration can comprise identifying an operating system installed on an existing node (perhaps including version and/or patch level information), determining what type(s) of clusterware are installed and/or in operation on the existing node, and/or identifying any installed application programs, especially any cluster-enabled application programs.

Determining an existing configuration can further include identifying the hardware and/or system configuration of an existing node, including without limitation the types and number of processors installed, the amount of memory installed, the configuration of any swap file, network parameters (including I/O settings, number and configuration of network adaptors, network addresses and/or hostnames, etc.) and/or application settings (such as RDBMS settings, etc.). Depending on the type of cluster-aware applications installed on the existing node, the configuration manager may also identify and/or analyze and application files (such as database files, etc.) that are being used for cluster operations.

Further, the characteristics of the cluster can be analyzed and/or recorded. Cluster characteristics can include inventories of nodes in the cluster and/or inventories of the tasks those nodes perform as part of the cluster. Communication protocols and/or parameters between the nodes, services provided, and other parameters can also be identified.

Alternatively (and/or in addition), determining an existing configuration may include consulting a cluster or node information file (which can be of any format, including for instance, XML) that contains such information. The information file may be an output file generated by a previous session with a configuration manager and/or may be created by an administrator manually and/or through another automated process. In this way, a node may be interrogated once to create an output file, which can then be used as a node/cluster information file for future node configuration tasks.

Node-specific information for the new node(s) can also be provided (block 315). Node-specific information can include any configuration settings or parameters that need to be configured uniquely for the new node, as opposed to parameters and/or configuration that the new node might share with other nodes. Such information can include network identifiers (e.g. IP addresses, hostnames), I/O configuration, swap file configuration, file locations, etc. In some cases, an administrator might provide node-specific information via an interactive process and/or via providing a file containing the information (as discussed in more detail below). In other cases, some of the node-specific information can be generated by the configuration manager. Merely by way of example, if each existing node in a cluster adheres to specific conventions (such as sequential hostnames, e.g., cluster_node_A, cluster_node_B, etc.), the configuration manager may supply an appropriate hostname for the new node, based on information obtained about the existing configuration of the cluster. Optionally, the administrator may be allowed to view and/or modify the generated information. The node-specific information may be stored in a configuration file, as described below in more detail.

At block 320, the new node can be validated. Validation of the new node can include any analysis used to determine whether the node meets the criteria for membership in the cluster. These criteria can be identified by reference to existing configuration information, by input from an administrator, by reference to requirements for any software necessary for the node to participate as a member of the cluster, and/or the like. Merely by way of example, the configuration manager, in determining an existing configuration, might discover that existing nodes use the Solaris™ operating system (perhaps at a certain patch level) and Oracle CRS™ clusterware, and that those existing nodes each have one cluster-aware application, the Oracle 10g™ RDBMS. The configuration manager might also discover that each of the existing nodes have at least 1 TB of available disk space, 2 GB of RAM and a 6 GB swap file. These characteristics, then, may be used as default criteria for validating any new node.

Optionally, an administrator may be given an opportunity to modify the criteria. Merely by way of example, while each of the existing nodes have at least 1 TB of available disk space, the administrator might specify that the new node need have only 500 GB of available disk space. In addition, the configuration manager can specify additional criteria based on installation requirements for the software found on existing nodes.

Validating the new node can further comprise ensuring that the new node meets the established criteria. One way of validating the new node, therefore, can be through the use of a prerequisite checker and/or prerequisite checking method, described in further detail in FIGS. 4-6 below, as well as in U.S. App. Ser. No. 10/901,831, filed Jul. 28, 2004, entitled "METHODS AND SYSTEMS FOR VALIDATING A SYSTEM ENVIRONMENT" by Paliwal et al., which issued as U.S. Pat. No. 7,536,599 on May 19, 2009, the complete disclosure of which is hereby incorporated by reference for all purposes. Merely by way of example, the configuration manager may incorporate a prerequisite checker and/or may have programmatic access to a prerequisite checker (e.g. through an API). The configuration manager, then, may invoke the prerequisite checker to validate the new node to be added.

Referring back to the example above, the prerequisite checker can be utilized by the configuration manager to ensure that the new node includes similar hardware to the existing nodes (and/or that the new node meets different hardware requirements, if specified by an administrator). The prerequisite checker can also ensure that the new node meets any additional requirements for the installation of Solaris™, Oracle CRS™, and/or Oracle 10g™ RDBMS.

Although the prerequisite checker described below may be used in some embodiments, other embodiments can use different procedures and/or programs to validate a node. Merely by way of example, the configuration manager may simply display the relevant features and/or parameters for an administrator, and allow the administrator to determine whether the new node meets all requirements. Optionally, the configuration manager may display these features/parameters, along with a required and/or suggested minimum configuration (which can be based on an existing configuration, software requirements and/or other factors), and allow an administrator to compare the actual configuration with the minimum configuration, possibly allowing the administrator to override warnings where the minimum configuration is not met. Those skilled in the art will appreciate, based on the disclosure herein, that many other methods of validating a new node could also be used, in accordance with various other embodiments.

In some cases, configuration source files may be used to facilitate the process of configuring a node for membership in a cluster. Configuration source files can be any files that provide guidance (e.g., to a configuration manager program) on how to configure a node for membership in a cluster and/or configure the cluster to accept the new node. Thus, the method 300 can further include preparing configuration source files for new and/or existing nodes (block 325). In some embodiments, the configuration source files may be formatted in such a way to allow easy parsing by both humans and computers and so may, for example, be formatted according to XML, HTML and/or any other useful formatting conventions known in the art. In some cases, a clusterware program and/or a cluster-aware application may store internally (and/or via accessible files) information about the cluster, such as node inventories, etc. The configuration manager may access this information (perhaps through an API) and/or may incorporate this information into a configuration source file. Alternatively, the configuration manager may simply reference these existing information sources as de facto configuration source files.

Often, it will be advantageous to prepare the configuration source files after an existing configuration has been determined and/or a node has been validated (e.g., as described above), since the existing configuration and the requirements for the validated node may affect what configuration needs to be performed for the new node and/or existing nodes in the cluster. Merely by way of example, if the node validation process indicates that the node's operating system needs to be updated to a certain patch level, and that certain software packages need to be installed on that node, for the node to function as part of the cluster, the configuration source files may reflect those needs by instructing that the configuration process needs to update the operating system and/or install the necessary software. (In other cases, however, the configuration source files may be prepared prior to these procedures, and may in fact be shipped already prepared with a configuration manager. Optionally, these files may be modified at this point in the process to account for system-specific dependencies, such as those discussed above.)

In accordance with some embodiments, one or more of the configuration source files may be prepared manually by an administrator (perhaps using supplied templates) and/or interactively, e.g., through interaction with a software program such as a configuration manager (for example, by filling out forms and/or answering questions, with the configuration manager using the supplied input to create or modify the appropriate configuration file). Alternatively and/or in addition, some configuration files may be generated automatically, perhaps based on configuration information obtained by the configuration manager from existing nodes (e.g., based on an interrogation of existing nodes and/or determination of existing configuration, described above with respect to blocks 305-310). All configuration information may be included in a single file, and/or a plurality of files may be used.

Merely by way of example, a first source file can include information about the software packages needed for membership in a cluster (including, merely by way of example, operating system, clusterware and/or application files), as well as installation and/or configuration information, including for example, which options should be invoked, how installation should proceed (e.g., using an installation program or by bit-by-bit copying, etc.), where installation code files may be located, where programs should be installed, etc.

A second file may include parameters specific to the cluster, such as a cluster identifier, an inventory of nodes and/or their capabilities, software, etc., locations of shared and/or master files (such as database files, etc.) and other configuration parameters known to those skilled in the art. A third configuration file may include configuration parameters specific to the each new node. Such parameters can include, again merely by way of example, swap file size, network address and/or hostname, etc. In some cases, therefore, it may be advantageous to use a plurality of configuration files, since many of the files need not be modified for different new nodes (e.g., files relating to required software and/or cluster parameters), while only the necessary files (e.g., files relating to node-specific parameters) need be modified on a node-by-node basis.

As indicated above, in some cases (such as, for example, when a new node is to be added to a cluster), a set of software may need to be installed and/or configured on a on a node to be configured (e.g., the new node). In accordance, with many embodiments, a configuration manager program may perform (and/or guide) the installation/configuration process. In particular cases, a packaged installation (i.e., execution of a third-party installation program for a commercial software package, execution of a "makefile" to compile executable binaries from source code, etc.) may be the desired installation method. In other cases, a bit-for-bit copy from an existing installation (e.g., from an existing node in the cluster and/or from a master "image" of a node) may be more appropriate. Based on the disclosure herein, those skilled in the art will appreciate that the choice of installation methods is discretionary and may vary from implementation to implementation. In fact, during the configuration of a particular node, multiple installation methods may be employed. Merely by way of example, an operating system may be installed by a bit-for-bit copy, while a clusterware program and/or application program may be installed via a packaged installation (or vice versa).

In any event, the method 300 may include the installation of an operating system (block 330). In some cases, the installation of the operating system may be performed by the configuration manager. Merely by way of example, the configuration manager may be embodied by a program on a CD-ROM, which may be configured as the "boot" medium for a new node. The configuration manager, then, may be used to install a new operating system (e.g., from code on the CD-ROM, from a network location, etc.), using a packaged installation and/or a bit-for-bit copy, as discussed above.

The operating system then may be configured (block 335). In some cases, configuration can include specifying general installation parameters and/or system parameters, such as swap file size, I/O parameters, file locations, network identification information and the like. In other cases (such as in a bit-for-bit copy), configuration of the operating system can comprise merely configuring parameters specific to the new node (i.e., parameters that are different for the new node than for the node from which the operating system was copied). In particular embodiments, the configuration manager may consult configuration source files (described above) to determine whether and how an operating system should be installed and/or configured.

The method 300 might further include installation and/or configuration of clusterware (blocks 340, 345 respectively) and/or application program(s) (blocks 350, 355 respectively) on the new node. Installation of these software components can be performed as described above, and/or the installation may be automatically performed (e.g., by a configuration manager), manually performed by an administrator and/or interactively performed by a program (e.g., a configuration manager) with administrator input. Once again, the installation and/or configuration of these components may be informed by an existing configuration for cluster nodes and/or facilitated by configuration source files.

Those skilled in the art will appreciate that many application programs may be designed to run in either a cluster or a non-cluster environment. That is, a program may be run in a cluster-aware mode or in a non-cluster-aware mode. In some cases, the application may need to be installed in a different manner (e.g., with certain installation options selected) to be cluster-aware. In other cases, the application may simply need to be modified after installation to run in a cluster-aware mode and/or be invoked in a cluster-aware mode. In either case, the procedures for installing (block 350) and/or configuring (block 355) can include configuring the application so that it will run in a cluster-aware mode.

In some cases, a new node may be shipped with some or all of the necessary software pre-installed, so that the installation procedures described in blocks 330, 340, and/or 350 are unnecessary. In such a case, the configuration manager may be instructed (e.g., via a command line parameter) not to install any software but merely to configure the software as necessary (e.g., as described with respect to blocks 335, 345, 355).

The method 300 can further include updating node-specific information (block 360). In some cases, this procedure may be performed with respect to the configuration of the operating system, clusterware and/or application (blocks 335, 345, 355, respectively). In other cases, however, such as where an entire set of software is copied from a master "image," only node-specific information may need to be updated on the new node, and that information may be updated after all installation (e.g., copying) is complete. As noted above, node-specific information can include any parameters and/or configuration information that is unique to the node being configured (as opposed to shared with other nodes), such as a network identifier, an identifier that identifies the node uniquely within the cluster, specific operating parameters that are unique to the node, etc.

At this point, the new (or reconfigured) node should be ready to join the cluster. Thus, at block 365, the cluster can be extended to the new node. In accordance with some embodiments, extending a cluster to a new node can include configuring the clusterware of each node (and/or of a master node) (including, for example, modifying a node inventory in each node), modifying any cluster-aware applications, extending application files (e.g., database files) to the new node, and/or the like. In many cases, the procedure of extending the cluster to the new node can be performed by a software program, such as the configuration manager, through programmatic access to the necessary software and/or files on each node, either automatically and/or interactively with the input of an administrator.

It should be appreciated that, while the method 300 illustrates procedures that may be performed in accordance with some embodiments of the invention, the method 300 is not exhaustive of all embodiments. Certain procedures may be performed in a different order than illustrated and/or may be performed iteratively. Merely by way of example, the procedure of validating a new node (block 310) may be performed once for each new node or, alternatively, may be performed iteratively for each software component to be installed on a new node. Similarly, some procedures may be omitted entirely for some embodiments. Thus, while the method 300 of FIG. 3 can be considered descriptive of many embodiments, it should not be considered in any way to limit the scope of the invention.

In yet another set of embodiments, a software program and/or set of associated software programs can be used to configure a cluster and/or any nodes thereof. One example of such a program is the configuration manager referred to above. In many cases, the configuration manager may have programmatic access to an operating system, clusterware and/or cluster-enabled application programs. In other cases, the configuration manager may be integrated with one or more of these software programs, such that it may be invoked by one (or more) of the programs, and/or one (or more) of the programs may be executed in "configuration manager" mode. Alternatively and/or in addition, the configuration manager may be integrated with (and/or invoked by) an installation program or package for one or more of these programs. Moreover, based on the disclosure herein, those skilled in the art will appreciate that embodiments of the invention include many different implementations of a configuration manager, either as a standalone product or as a component of another product.

Figure 4A:
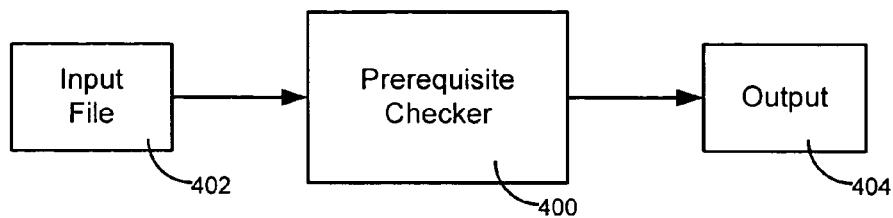
FIG. 4A is a block diagram illustrating an exemplary embodiment of a prerequisite checker that may be used to validate system environment requirements for an application.
Figure 4B:
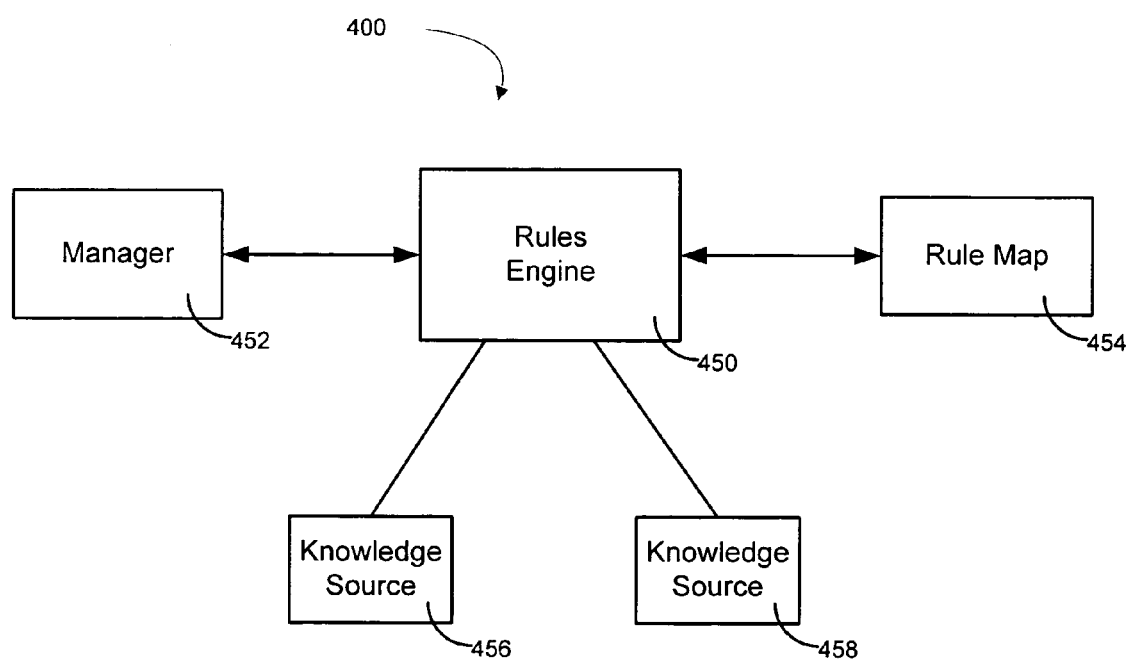
FIG. 4B is a block diagram illustrating an exemplary embodiment of the prerequisite checker of FIG. 4A.
Figure 5:
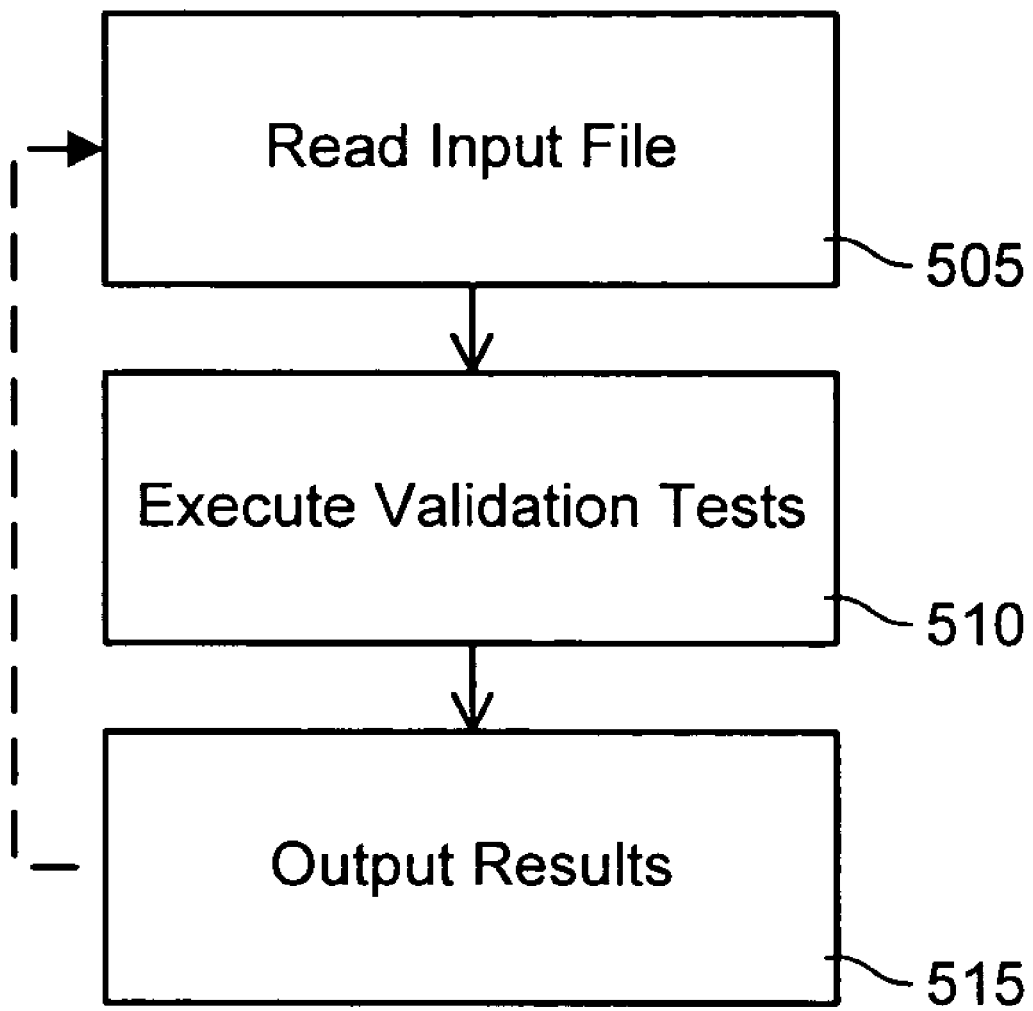
FIG. 5 illustrates an exemplary method that may be used to perform prerequisite checking to validate a system environment for an application, in accordance with various embodiments of the invention.
Figure 6:
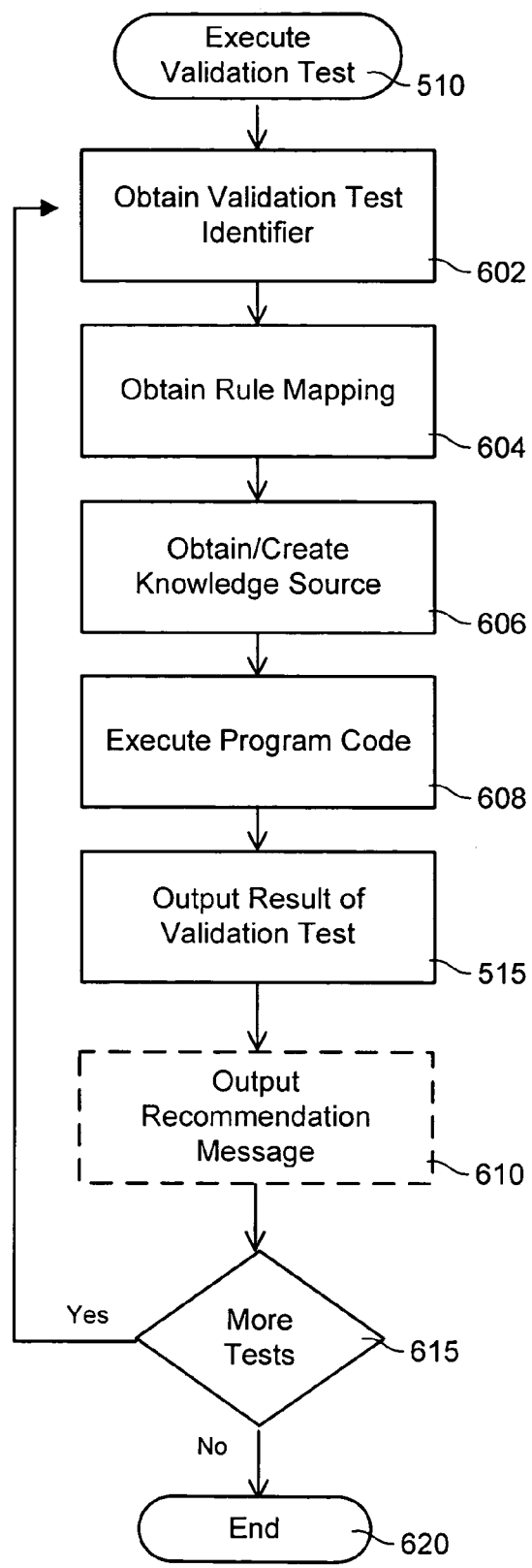
FIG. 6 illustrates an exemplary method that may be used by the method of FIG. 5 to execute validation tests, in accordance with various embodiments of the invention.

As noted above, some embodiments of the invention feature a procedure for node and/or cluster validation, and a prerequisite checker and/or method of checking prerequisites may be employed as part of such a validation procedure. FIGS. 4-6 illustrate exemplary embodiments of prerequisite checkers and methods of checking prerequisites, which may be used in accordance with embodiments of the invention. FIG. 4a is a block diagram illustrating one embodiment of a prerequisite checker 400. Prerequisite checker 400 may be program code used to validate system environment requirements for one or more applications. The system environment requirements refer to requirements for the application to execute properly on a system, such as user computer 105, 110, and/or server 120, 125, 130. Merely by way of example, system environment requirements may include hardware element requirements (e.g., CPU speed, available memory, total memory, storage space capacity/availability, display capabilities of a display device, etc.), operating system requirements (e.g., operating system version, operating system packages, operating system patches (also referred to by some operating systems as service packs), etc.), system configuration requirements (e.g., page (swap) size, user privileges, etc.), and/or other applications executing on the system. Alternate or additional system environment requirements may also be verified by prerequisite checker 400.

Prerequisite checker may be a component of an installation program used to install an application or a component of the application (e.g., Oracle's Universal Installer™). Upon successful completion of the validation tests validating a system environment, the installation program may be used to install the application or application component. Alternately, prerequisite checker 400 may be a standalone program, which may be executed independent of installation of an application. To determine which validation tests are to be executed for an application, a prerequisite checker may read an input file 402. The input file 402 may be used to identify the validation tests to be executed to validate system environment requirements for the application. In some cases, the input file 402 can comprise and/or be based upon a configuration source file and/or an output file from a node cluster configuration process (as described above, for example). In one embodiment, the input file may be an XML file having a plurality of validation test identifiers identifying validation tests to be executed. The validation test identifiers may identify a single validation test or a group of validation tests. Other types of information may also be included in the input file. For example, the input file may further include a description of the validation test, a severity (e.g., warning, critical, etc.) associated with a failure of the validation test, text to be output if the validation test fails, recommendation text recommending a course of action if the validation test fails, and/or other type of information that may be used by a validation test, or by a user or installation program. In some embodiments, the severity of a failed validation test indicated in the input file may determine if subsequent validation tests should be executed. As will be described in further detail below, the input file may also identify sources of information to be used to execute the validation test.

It should be appreciated that by using an input file 402, such as an XML file, to specify the validation tests to execute, the prerequisite checking for an application may be easily modified to include different or additional tests. It should also be appreciated that by using different input files 402, prerequisite checker 400 may be used to validate system environment requirements for multiple application having different system environment requirements. Additionally, prerequisite checker 400 may also be used to validate the system environment for an application for more than one system platform (hardware/operating system combination of a system) to execute the application.

Prerequisite checker 400 may output the results of the validation tests in various formats. For example, a log file may be used to log the results and progress of each validation test. Alternately, or additionally, messages may be displayed to a user via a console or graphical user interface (GUI). Further, in some embodiments, an output file may be created by prerequisite checker 400 that may be used as an input file, or part of the input, to subsequent validation of the system environment after corrective action has been taken to resolve a failed validation test.

In some embodiments, prerequisite checker 400 may include a variety of components or modules. FIG. 4b illustrates one exemplary configuration of a prerequisite checker 400. In this embodiment, the prerequisite checker 400 includes a manager 452, a rules engine 450, a plurality of knowledge sources 456, 458, and a rule map 454. The prerequisite checker 400 (and/or any of its components) may be incorporated in and/or in communication with a configuration manager, installation program, etc. Hence, the prerequisite checker may be a stand-alone program (or set of programs), application component, etc., and/or may have (and/or offer) programmatic access (e.g., through and API) to other components/programs. The rules engine 450 is communicatively coupled to each of the other components. A communicative coupling is a coupling that allows communication between the components. By way of example, this may be by means of an internal bus, software API, and/or an external communication means, such as network 115. Thus, the various components may reside on the same or different machines.

Manager 452 may be used to read the input file 402, which identifies the validation tests to be executed. The manager 452 may be responsible for transmitting the validation test identifiers to rules engine 450 for execution. In some embodiments, the validation test identifiers may be transmitted one at a time, so that manager 452 may monitor the results of each test. In some cases, if a validation test fails, subsequent validation test identifiers in the input file may not be transmitted to rules engine 450 for execution. For example, if a test for an operating system version fails, subsequent tests for operating system patches may not be executed.

The rules engine 450 may include, or be communicatively coupled to, the program code used to execute the tests. Rules engine 450 may be used to execute the program code and determine a result of a validation test based on the program code execution. The result of the validation test may then be reported to manager 452. In one embodiment, the program code may be Java™ programs provided in class files, each class file including one or more methods used to execute a validation test. In order to determine which program code to execute, the rules engine 450 may be communicatively coupled to a rule map 454. The rule map 454 may map a validation test identifier to a program code identifier. By way of example, the rule map 454 may be a file, such as an XML file.

In some embodiments, separate rule maps 454 may be provided for different system environments for an application (e.g., Solaris™, Windows™, etc.). This may facilitate the ability to specify the program code which executes a validation test (e.g., a test for available memory) on the different system platforms. Additionally, rule map 454 may also provide the ability to change the program code to execute a validation test and/or provide the ability to add custom validation tests to prerequisite checker 400 merely by providing a pointer in the rule map 454 to the custom program code. Alternate embodiments may not include rule map 454 and instead may rely on manger 452 or the input file 402 to identify the program code to execute for a validation test.

Rules engine 450 may also be communicatively coupled to one or more knowledge sources 456, 458 having information used by one or more validation tests. In some embodiments, there may be separate knowledge sources 456, 458 for different types of information. Knowledge sources may be, in some cases, configuration files and/or configuration source files. One example of a knowledge source 456 may be a knowledge source 456 having information on the actual host system for which the system environment for the application is being verified (e.g., the host system on which the application or application is to be installed). Another example may be a knowledge source 456 that includes information on an exemplary host system environment, such as a host environment that is replicated on multiple computers (e.g., cluster nodes), such that all computers have the same or similar system environment parameters. By way of example, the host system information in a knowledge source may include available memory, total memory, CPU speed, page/swap size, device capabilities, operating system version, operating system packages/patches installed, applications (or a portion of the applications) installed, or other types of host system environment information.

Another type of knowledge sources 458 may be reference information used by the prerequisite checker 400 to determine system platform requirements for the application. A knowledge source 458 may be created for each of the system platforms for which the application has different system environment requirements. By way of example, a system platform knowledge source 458 may include total/available memory needed by the application to execute on the system platform, operating system packages and/or patches needed by the application to run properly on the system platform, memory requirements of the application for the system platform, system platform configuration requirements, and other types of information specifying the system platform requirements of the application.

As another example, a knowledge source 458 may comprise information received by a user (e.g., whether the user has administrative privileges). Other types of knowledge sources are also contemplated. It should be appreciated that in alternate embodiments, the information used by validation tests may be contained in knowledge sources 456, 458 which are divided in different ways than that described above or the information may be contained in a single knowledge source.

In some embodiments, one or more knowledge sources may be used to validate a system environment for a host system for a future installation of an application. Thus, a knowledge source may model a "test" host environment for an anticipated configuration of a host system. This may assist a data center in setting up computers to meet an application's requirements before an attempt is made to install the application.

Program code may use a specified knowledge source to execute a validation test. By way of example, the knowledge source to be used for a validation test may be specified in the input file 402. It should be appreciated that knowledge sources 456, 458 may be stored in a variety of different types of formats. In one embodiment, the knowledge sources are files, such as XML files. This may allow the prerequisite checker 400 to be easily modified to change or add requirements for an application, and/or include new types of system platforms. Other types of formats are also contemplated, such as databases, internal program storage structures, or other types of mechanisms that may be used by rules engine 450. It should also be appreciated that alternate embodiments may not include knowledge sources 456, 458.

FIG. 5 illustrates an exemplary method that may be used to perform prerequisite checking to validate a system environment for an application. An input file is read 505. The input file (e.g., an XML file) may have a plurality of validation test identifiers, which can identify validation tests that are used to validate a system environment for an application. The validation test identifiers may be identifiers which are mapped in a rule map 454, program code identifiers or program code invocations, or other means of identifying validation tests.

At block 510, at least a portion of the validation tests identified by the validation test identifiers in the input file can be executed. Some of the validation tests may cause critical errors, which cause other validation tests to not execute. For example, failure of a validation test which verifies that the system environment is using a supported operating system may result in validation tests for operating system patches to not execute. In some embodiments, as many of the validation tests as possible are executed in order to provide a relatively complete listing of the system environment errors which need to be corrected for the application to execute properly.

The results of the validation test executions are outputted. The results indicate whether a validation test passed or failed, or has some other type of status. A variety of different mechanisms, or combination of mechanisms, may be used to output the results. For instance, the results of the validation tests may be output to a console and/or a GUI. Additionally, or alternately, the results may be output to a log file. In some cases, the results may be output to another program/component, such as an installation program and/or configuration manager. In some embodiments, only the validation tests which fail are outputted. Thus, if the validation tests all execute successfully, the only output may be a message to that effect, or there may not be any output at all.

In one embodiment, the results of the validation tests may be output to a second file, such as an XML file. This file may include information of the failed validation test identifiers which identify validation tests that failed. This file may also include the validation test identifiers for validation tests which were not executed. In some embodiments, the second file which is output may be similar to the input file, but may have an indication for each test whether it passed, failed, or did not execute. Upon receiving an indication that the system environment has changed (e.g., a subsequent invocation of the prerequisite checker 400), the second file may be used as, or by, the input file 505 for the subsequent execution 510. Thus, on subsequent prerequisite checks, only the tests that failed, had some other type of error, or were not executed in a previous check may be executed.

Some of the validation tests may need to be executed manually by a user. Thus, in some instances, the execution 510 of the validation test may comprise a determination that the validation text is to be executed manually. In some embodiments, the input file may specify that a validation test is a manual test. Thus, the results that are output 515 may be specify that a test must be executed manually. Instructions on how to execute the manual validation test may also be provided. Optionally, the prerequisite checker 400 may wait to receive an indication from the user that the manual validation test passed before it determines that the prerequisite checking for the application completed successfully (e.g., before the application may be installed).

The method illustrated in FIG. 5 may be repeated on multiple computers. Alternately, or additionally, the method may be used to validate system environment requirements for a second application. At block 505, a second input file identifying the validation tests to use to verify the system environment for the second application is read 505. The validation tests for the second application are executed 510 and the results are outputted 515.

One exemplary method that may be used by the method of FIG. 5 to execute 510 validation tests is illustrated in FIG. 6. A validation test identifier 602 is obtained from the input file. Next, a rule mapping 454, which maps the validation test identifier to a program code identifier identifying program code for the validation test (class file, program method) is obtained 604. By way of example, the rule mapping may be obtained 604 by reading a rule map file (e.g., an XML file).

One or more knowledge sources 456, 458 may also be obtained 604. As previously described, knowledge sources 456, 458 may be files having information on a host system, system platform requirements, and/or information received as user inputs. In embodiments having multiple knowledge sources, the knowledge source used by a validation test may be indicated in the input file, the rule mapping file, or the validation test program code.

In some instances, a knowledge source for a validation test may not yet be created or may be dynamic. In those instances, the knowledge source may be created by executing program code to obtain the information and/or receiving one or more user inputs. The information that is created may optionally be stored (e.g., in a knowledge source file) for later use or subsequent invocations of prerequisite checker 400.

The program code identified in the rule mapping is then executed (block 608), e.g., using the knowledge source. In some embodiments, or with some output mechanisms, the results of each individual validation test are output 515 at the completion of the program code execution. In addition to the results of the test, other types of information may also be output. For example, if a validation test fails, recommendation text specifying a recommended course of action to correct the error may also be output 610. As a second example, a severity associated with a failed validation test may be output. In some embodiments, the additional information to be output may be retrieved from the input file.

If there are more validation tests that were identified in the input file (block 615), the method may continue back at block 602 to obtain the next validation test identifier. Otherwise, the method may end 620. In some embodiments, if the prerequisite checking completed successfully, the application or application component may then be installed.

A similar method to that described above may also be used to execute validation tests for the application on a different system platform. The same input file 505 may be used to identify the validation tests to be executed. However, a different rule mapping may be obtained (block 604). The second rule mapping may map the validation test identifiers to the program code that executes a validation test on the subsequent system platform.

It should be appreciated that in alternate embodiments, validation tests may be executed (block 510) using a different or modified procedure than that described in FIG. 6. For instance, in some embodiments, a rule mapping may not be obtained (block 604); for instance, the validation test identifier may identify the specific program code to execute for the validation test. Other modifications are also contemplated.

The foregoing description, for the purposes of illustration, described various methods in a particular order. It should be appreciated that in alternate embodiments, the methods may be performed in a different order than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Hence, various embodiments of the invention provide inventive methods, systems and software products for configuring cluster environments and/or nodes within such environments. The description above identifies certain exemplary embodiments for implementing the invention, but those skilled in the art will recognize that many modifications and variations are possible within the scope of the invention. The invention, therefore, is defined only by the claims set forth below.

What is claimed is:

1. A clustered computer system, comprising:
a cluster of two or more nodes, the cluster comprising:
at least a first node computer comprising a first processor and a first computer readable medium, the first computer readable medium having a first set of software comprising:
an operating system executable by the first processor;
clusterware program executable by the first processor to allow the first node computer to operate as part of a cluster environment; and
an application program executable by the first processor to provide application services as part of the cluster environment;
a second node computer independent of and new to the cluster, the second node computer comprising;
a second processor; and
a second computer readable medium having a second set of software; and
a control computer in communication with the second node computer and the cluster, the control computer comprising a third processor and a third computer readable medium, the third computer readable medium comprising instructions executable by the third processor to:
validate the second node computer to determine whether the second set of software and hardware of the second node computer meets hardware and software requirements for participation in the cluster environment, wherein validating the second node computer comprises reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application, reading a first rule mapping file to obtain a first mapping between a first validation test identifier and a first program code identifier identifying first program code for performing at least a portion of the first validation tests, executing the first program code to perform the at least a portion of the first validation tests to determine whether the system environment's system resources meet the minimum requirement, reading a second input file having a second plurality of validation test identifiers identifying second validation tests to validate the system environment for a second software application, reading a second rule mapping file to obtain a second mapping between a second validation test identifier and a second program code identifier identifying second program code for performing at least a portion of the second validation tests, executing the second program code to perform the at least a portion of the second validation tests to validate the system environment for the second software application, and outputting results of the validation tests; and configure the second set of software to allow the second node computer to join the cluster if the second node computer is validated, wherein the second node computer communicates with the first node computer after joining the cluster.

2. A clustered computer system as recited in claim 1, wherein the third computer readable medium comprises further instructions executable by the third processor to configure the second set of software to allow the second node computer to provide application services as part of the cluster environment.

3. A clustered computer system as recited in claim 2, wherein the application services comprise services selected from a group consisting of database services, Internet services, World Wide Web services, and enterprise application services.

4. A clustered computer system as recited in claim 1, wherein configuring the second set of software to allow the second node computer to operate as part of the cluster environment comprises:
installing an operating system on the second node computer; and
configuring the operating system on the second node computer.

5. A clustered computer system as recited in claim 1, wherein configuring the second set of software to allow the second node computer to operate as part of the cluster environment comprises:
installing a clusterware program on the second node computer; and
configuring the clusterware program on the second node computer.

6. A clustered computer system as recited in claim 1, wherein configuring the second set of software to allow the second node computer to operate as part of the cluster environment comprises:
installing an application program on the second node computer; and
configuring the application program on the second node computer.

7. A clustered computer system as recited in claim 1, wherein configuring the second set of software to allow the second node computer to operate as part of the cluster environment comprises:
interrogating the first node computer to determine a configuration of the first set of software.

8. A clustered computer system as recited in claim 1, wherein configuring the second set of software to allow the second node computer to operate as part of the cluster environment comprises:
allowing an administrator to input parameters specific to the second node computer.

9. A clustered computer system as recited in claim 1, wherein configuring the second set of software to allow the second node computer to operate as part of the cluster environment comprises:
updating the second set of software with parameters specific to the second node computer.

10. A clustered computer system as recited in claim 1, wherein the third computer readable medium comprises further instructions executable by the third processor to configure the first node computer to recognize the second node computer as a member of the cluster environment.

11. A clustered computer system, comprising:
a first node computer comprising a first processor and a first computer readable medium, the first computer readable medium having a first set of software comprising:
an operating system executable by the first processor;
a clusterware program executable by the first processor to allow the first node computer to operate as part of a cluster environment; and
an application program executable by the first processor to provide application services as part of the cluster environment;
a second node computer in communication with the first node computer, the second node computer independent of and new to the cluster and comprising a second processor and a second computer readable medium having a second set of software; and
a control computer in communication with the second node computer, the control computer comprising a third processor and a third computer readable medium, the third computer readable medium comprising instructions executable by the third processor to:
interrogate a first node computer;
determine an existing configuration of a first node computer in a cluster environment from the interrogation;
receive information specific to the second node computer;
validate the second node computer based on the information specific to the second node computer to determine whether the second set of software and hardware of the second node computer meets hardware and software requirements for participation in the cluster environment, wherein validating the second node computer comprises reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application, reading a first rule mapping file to obtain a first mapping between a first validation test identifier and a first program code identifier identifying first program code for performing at least a portion of the first validation tests, executing the first program code to perform the at least a portion of the first validation tests to determine whether the system environment's system resources meet the minimum requirement, reading a second input file having a second plurality of validation test identifiers identifying second validation tests to validate the system environment for a second software application, reading a second rule mapping file to obtain a second mapping between a second validation test identifier and a second program code identifier identifying second program code for performing at least a portion of the second validation tests, executing the second program code to perform the at least a portion of the second validation tests to validate the system environment for the second software application, and outputting results of the validation tests;

prepare a model configuration for the second node computer if the second node computer is validated, wherein the model configuration combines the existing configuration of the first node computer with the information specific to the second node computer;

configure the second node computer according the model configuration; and add the second node computer to the cluster environment if the second node computer is validated.

12. A method of configuring a node in a cluster computing environment, the method comprising:

interrogating a first node computer with a control computer;

determining, with a control computer, an existing configuration of a first node computer in a cluster environment from the interrogation;

receiving information specific to a second node computer to be configured, the second node computer independent of and new to the cluster;

validating the second node computer based on the information specific to the second node computer to determine whether a second set of software and hardware of the second node computer meets hardware and software requirements for participation in the cluster environment, wherein validating the second node computer comprises reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application, reading a first rule mapping file to obtain a first mapping between a first validation test identifier and a first program code identifier identifying first program code for performing at least a portion of the first validation tests, executing the first program code to perform the at least a portion of the first validation tests to determine whether the system environment's system resources meet the minimum requirement, reading a second input file having a second plurality of validation test identifiers identifying second validation tests to validate the system environment for a second software application, reading a second rule mapping file to obtain a second mapping between a second validation test identifier and a second program code identifier identifying second program code for performing at least a portion of the second validation tests, executing the second program code to perform the at least a portion of the second validation tests to validate the system environment for the second software application, and outputting results of the validation tests;

preparing, with the control computer, a model configuration for the second node computer if the second node computer is validated, wherein the model configuration combines the existing configuration of the first node computer with the information specific to the second node computer;

configuring, with the control computer, the second node computer according the model configuration; and adding the second node computer to the cluster environment if the second node computer is validated.

13. A method of configuring a node in a cluster computing environment as recited in claim 12, wherein configuring the second node computer comprises installing a set of software on the second node computer.

14. A method of configuring a node in a cluster computing environment as recited in claim 13, wherein configuring the second node computer comprises configuring the set of software on the second node computer to allow the second node computer to serve as a member of the cluster environment.

15. A method of configuring a node in a cluster computing environment as recited in claim 13, wherein the set of software comprises an operating system.

16. A method of configuring a node in a cluster computing environment as recited in claim 13, wherein the set of software comprises a clusterware program.

17. A method of configuring a node in a cluster computing environment as recited in claim 13, wherein the set of software comprises an application program.

18. A method of configuring a node in a cluster computing environment as recited in claim 17, wherein configuring the second node computer comprises configuring the application program to be cluster-enabled.

19. A method of configuring a node in a cluster computing environment as recited in claim 13, wherein determining an existing configuration of a first node computer comprises identifying a first set of software installed on the first node computer, and wherein installing a set of software on the second node computer comprises installing a second set of software on the second node computer, the second set of software corresponding to the first set of software.

20. A method of configuring a node in a cluster computing environment as recited in claim 19, wherein installing a second set of software on the second node computer comprises updating at least one parameter on the second node computer with information specific to the second node computer.

21. A method of configuring a node in a cluster computing environment as recited in claim 12, wherein the first node computer comprises a cluster inventory, and wherein adding the second node computer to the cluster environment comprises updating the cluster inventory to account for the second node computer.

22. A method of configuring a node in a cluster computing environment as recited in claim 12, wherein validating the second node computer comprises using a prerequisite checker to validate the second node computer.

23. A method of configuring a node in a cluster computing environment as recited in claim 12, wherein validating the second node computer comprises:

reading an input file having a plurality of validation test identifiers identifying validation tests to validate a system environment for an application;

executing at least a portion of the validation tests; and outputting the results of the validation tests.

24. A computer program product comprising:
a machine readable medium having stored thereon a set of machine-executable instructions comprising code executable by a machine to:
interrogate a first node;
determine an existing configuration of the first node computer in a cluster environment from the interrogation;
receive information specific to a second node computer to be configured, the second node computer independent of and new to the cluster;
validate the second node computer based on the information specific to the second node computer to determine whether a second set of software and hardware of the second node computer meets hardware and software requirements for participation in the cluster environment, wherein validating the second node computer comprises reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application, reading a first rule mapping file to obtain a first mapping between a first validation test identifier and a first program code identifier identifying first program code for performing at least a portion of the first validation tests, executing the first program code to perform the at least a portion of the first validation tests to determine whether the system environment's system resources meet the minimum requirement, reading a second input file having a second plurality of validation test identifiers identifying second validation tests to validate the system environment for a second software application, reading a second rule mapping file to obtain a second mapping between a second validation test identifier and a second program code identifier identifying second program code for performing at least a portion of the second validation tests, executing the second program code to perform the at least a portion of the second validation tests to validate the system environment for the second software application, and outputting results of the validation tests;
prepare a model configuration for the second node computer if the second node computer is validated, wherein the model configuration combines the existing configuration of the first node computer with the information specific to the second node computer;
configure the second node computer according the model configuration; and
add the second node computer to the cluster environment if the second node computer is validated.

25. A computer program product as recited in claim 24, wherein the code is configured to be executed on the first node computer.

26. A computer program product as recited in claim 24, wherein the code is configured to be executed on the second node computer.

27. A computer program product as recited in claim 25, wherein the code is configured to be bootable by the second node computer.

28. A computer program product as recited in claim 24, wherein the code is configured to be executed on a control computer separate from the first and second node computers.

29. A computer program product as recited in claim 24, wherein the computer program product incorporates a prerequisite checker.

30. A system comprising:
means for interrogating a first node computer with a control computer;
means for determining, with a control computer, an existing configuration of a first node computer in a cluster environment from the interrogation;
means for receiving information specific to a second node computer to be configured, the second node computer independent of and new to the cluster;
means for validating the second node computer based on the information specific to the second node computer to determine whether a second set of software and hardware of the second node computer meets hardware and software requirements for participation in the cluster environment, wherein said means for validating the second node computer comprises reading a first input file having a first plurality of validation test identifiers identifying first validation tests to validate whether a system environment's level of system resources meet a minimum requirement, wherein the minimum requirement indicates a minimum level of system resources required for the system environment to support installation of a first software application, wherein the first validation tests are associated with the first software application, reading a first rule mapping file to obtain a first mapping between a first validation test identifier and a first program code identifier identifying first program code for performing at least a portion of the first validation tests, executing the first program code to perform the at least a portion of the first validation tests to determine whether the system environment's system resources meet the minimum requirement, reading a second input file having a second plurality of validation test identifiers identifying second validation tests to validate the system environment for a second software application, reading a second rule mapping file to obtain a second mapping between a second validation test identifier and a second program code identifier identifying second program code for performing at least a portion of the second validation tests, executing the second program code to perform the at least a portion of the second validation tests to validate the system environment for the second software application, and outputting results of the validation tests;
means for preparing, with the control computer, a model configuration for the second node computer, wherein the model configuration combines the existing configuration of the first node computer with the information specific to the second node computer;
means for configuring, with the control computer, the second node computer according the model configuration; and
means for adding the second node computer to the cluster environment.

31. The clustered computer system of claim 11, wherein:
determining an existing configuration of a first node computer comprises analyzing a set of software on first node computer to determine what software is installed on the first node computer.

32. The clustered computer system of claim 11, wherein:
determining an existing configuration of a first node computer comprises identifying a hardware configuration of the first node computer.

33. The clustered computer system of claim 11, wherein:
preparing a model configuration for the second node computer comprises preparing a configuration source file for the second node computer, based on the existing configuration of the first node computer.

34. The clustered computer system of claim 33, wherein the configuration source file comprises information about one or more software packages installed on the first node computer.

35. The clustered computer system of claim 11, wherein the information specific to the second node computer is selected from the group consisting of a network identifier of the second node computer, an input-output configuration of the second node computer, a swap file configuration of the second node computer, and a set of file locations for the second node computer.

36. The method of claim 12, wherein validating the second node computer comprises:
    ensuring that the second node computer includes similar hardware to the first node computer.

37. The method of claim 12, wherein validating the second node computer comprises:
    displaying information about a hardware or software configuration of the second node computer; and
    displaying information about a minimum configuration for the second node computer.

* * * * *